United States Patent [19]

Grinde

[11] 4,437,534
[45] Mar. 20, 1984

[54] SNOW VEHICLE

[75] Inventor: James E. Grinde, Anoka, Minn.

[73] Assignee: Yamaha Hatsudoki Kabushiki Kaisha, Iwata, Japan

[21] Appl. No.: 346,946

[22] Filed: Feb. 8, 1982

[51] Int. Cl.³ .......................................... B62M 27/02
[52] U.S. Cl. ............................. 180/190; 180/9.24 A; 180/9.5; 180/9.54; 180/9.56; 305/21; 305/24
[58] Field of Search ...................... 180/9.5, 9.54, 9.56, 180/9.58, 184, 185, 186, 190, 193, 227, 9.24 A; 305/21, 24, 27; 280/446 B

[56] References Cited

U.S. PATENT DOCUMENTS

| Re. 26,775 | 1/1970 | Smieja | 180/9.23 |
| 3,779,326 | 12/1973 | Trautwein | 180/190 |
| 3,785,680 | 1/1974 | Good et al. | 280/446 B |
| 3,822,755 | 7/1974 | Hine | 180/185 |

FOREIGN PATENT DOCUMENTS 245866  8/1947  Switzerland ................. 180/9.25

Primary Examiner—Joseph F. Peters, Jr.
Assistant Examiner—Kenneth R. Rice
Attorney, Agent, or Firm—Ernest A. Beutler

[57] ABSTRACT

An improved lightweight snow vehicle that embodies an improved suspension that permits ease of riding of the vehicle while maintaining good control and handling. The drive belt is supported so that the vehicle has a longer effective length than prior art devices of the same overall length and so that on increased suspension travel a larger portion of it engages the ground. In addition, the body of the vehicle is pivotally supported for leaning movement relative to the rear of the drive belt about a pivot axis that is disposed closely adjacent the ground. The vehicle may, therefore, be ridden like a motorcycle without sacrificing the contact patch between the drive belt and the terrain over which the vehicle is travelling.

36 Claims, 6 Drawing Figures

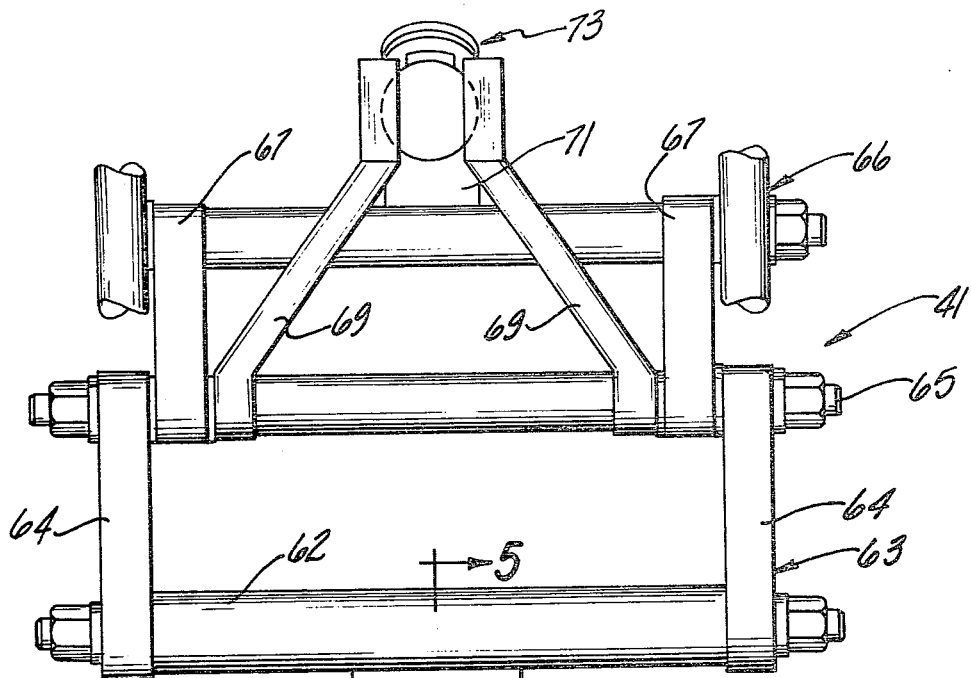
_Fig-4_
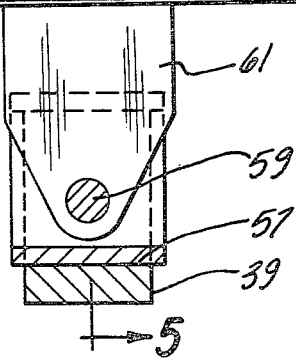
_Fig-5_
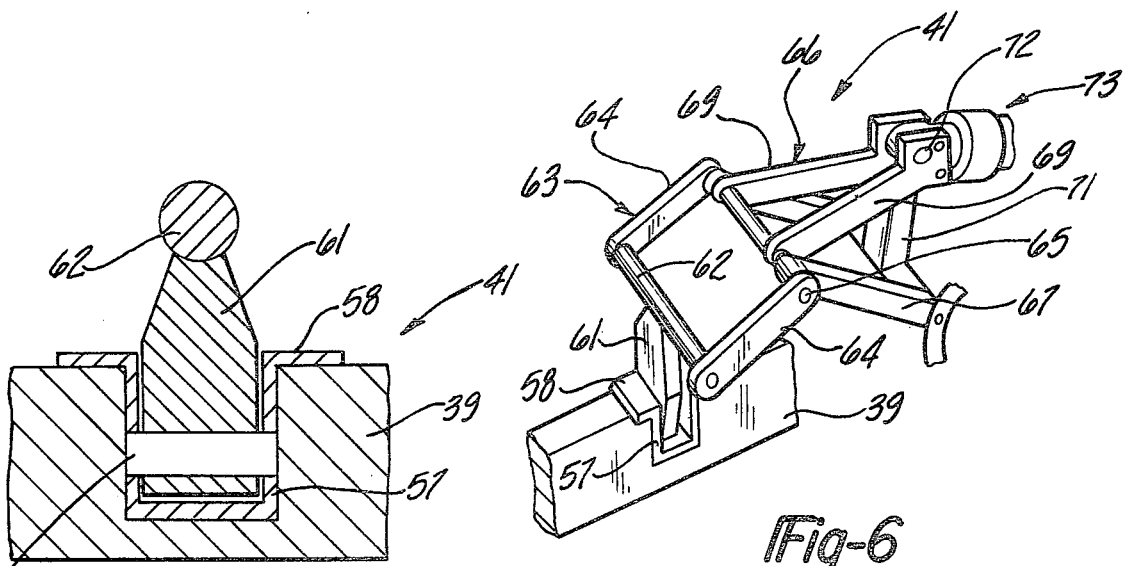
_Fig-6_

SNOW VEHICLE

BACKGROUND OF THE INVENTION

This invention relates to a snow vehicle and more particularly to an improved, lightweight snow vehicle.

The use of snowmobiles as both recreational and functional vehicles for travelling over snowy terrain is well known. For the most part, the known type of snowmobiles are relatively large, heavy and expensive machines. Because of these factors, there is a relatively limited market for such machines. Attempts have been made to provide relatively small one-person snow vehicles that can be easily transported and yet will afford the same recreational and functional advantages as a snowmobile. However, attempts to reduce the size of the snow vehicles to those akin to a motorcycle have not been fully successful. As the size of the snow vehicle is reduced and as manufacturing costs are attemped to be reduced, it is extremely difficult to provide a lightweight snow vehicle which is easy to operate safely and which will afford the necessary riding enjoyment and functionality.

One reason why it has been difficult to provide a satisfactory lightweight snow vehicle is the wide variety of terrain over which such vehicles travel. Snow vehicles may encounter deep powdery snow, hard packed snow, ice and even in some instances hard pavement or bare ground. In addition, it is not at all uncommon that the terrain over which the vehicle travels may very greatly in grade. In addition, the vehicle must be capable of sudden changes in direction to avoid impact with partially concealed objects.

It has been proposed to provide a lightweight, single-person snow vehicle which is some regards a motorcycle. Attempts to provide a vehicle of this type have, heretofore, not been fully satisfactory. To provide a small vehicle it is generally necessary to use only a single steering ski and relatively narrow driving belt. Such narrow drive belts do not afford good stability and a fair degree of expertise has been required to operate such vehicles. One problem is that it is difficult to maintain a narrow vehicle of this type in an erect position when travelling. Leaning of the vehicle, which is a natural tendency on the part of an operator when negotiating a turn, has further reduced the contact area between the drive belt and the terrain because of the type of suspension systems heretofore proposed.

It is, therefore, a principal object of this invention to provide and improved, lightweight snow vehicle.

It is another object of ths invention to provide a lightweight, lost cost snow vehicle that is adapted to provide good performance over a wide variety of conditions.

It is yet a further object of this invention to provide a snow vehicle suspension that provides good handling and will inspire operator confidence.

SUMMARY OF THE INVENTION

A first feature of this invention is adapted to be embodied in a small, lightweight vehicle having frame means, a front ski supported for steering movement by the frame means, an endless drive belt, and power means carried by the frame means for driving the driving belt. The driving belt has a drive portion that is positioned for engaging the terrain over which the vehicle is operated for driving the vehicle therealong. In accordance with this feature, the invention suspension means support the driving belt and frame means for relative pivotal movement about an axis that extends generally longitudinally of the frame so that an operator may lean the frame relative to the driving belt without changing the area of engagement between the belt and the terrain.

Another feature of the invention is also adapted to be embodied in a small, lightweight vehicle having frame means, a steerable front ski supported by the frame means, an endless driving belt, and power means for driving the driving belt. In accordance with this feature of the invention, suspension means support the drive belt and the frame means for relative movement about a longitudinal axis as set forth in the preceding paragraph and also for relative vertical movement.

BRIEF DESCRIPTION OF THE DRAWINGS

FIG. 4 is an enlarged view taken generally in the direction of the arrow 4 in FIG. 1 and shows the rearwardmost suspension of the drive belt.

FIG. 5 is a cross-sectional view taken along the line 5—5 of FIG. 4.

FIG. 6 is a perspective view showing the details of the rear belt suspension.

DETAILED DESCRIPTION OF THE PREFERRED EMBODIMENT

Figure 1:
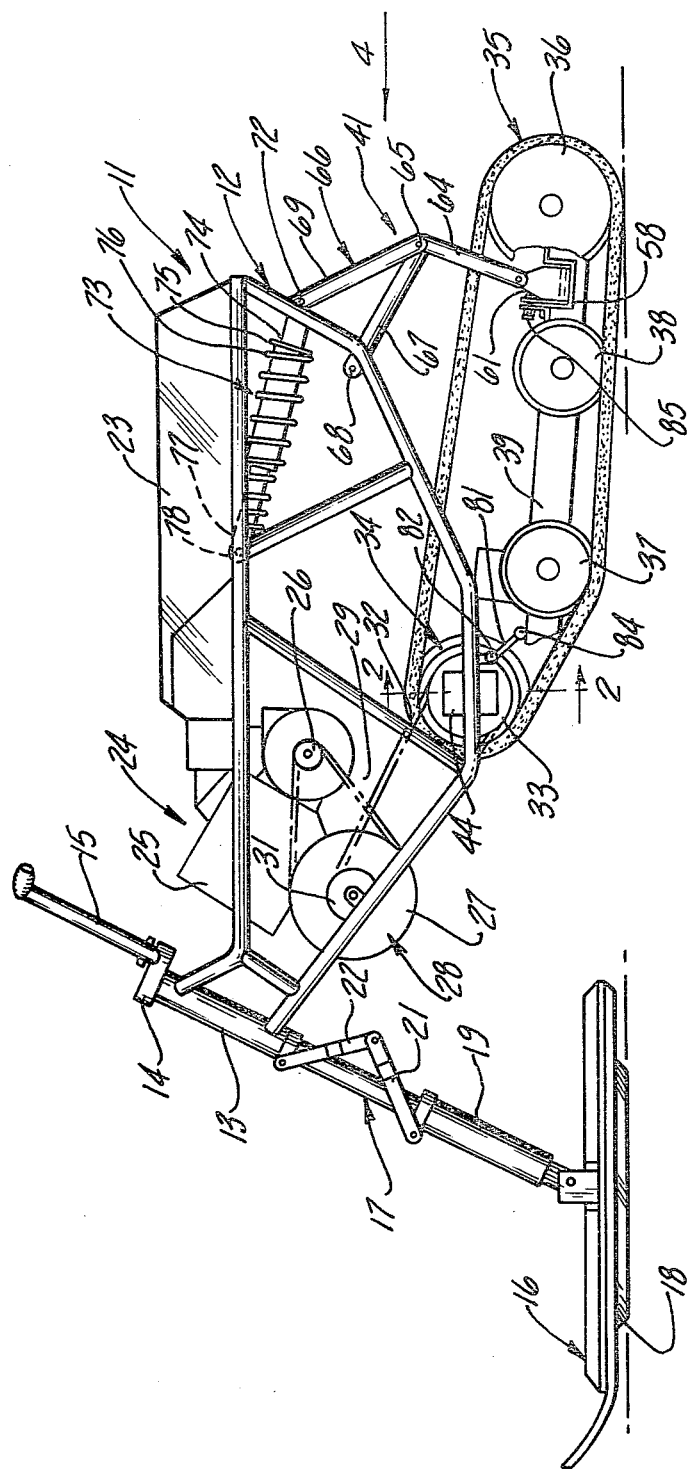
FIG. 1 is a side elevational view of a snow vehicle constructed in accordance with an embodiment of this invention and showing the vehicle as it appears when travelling over relatively firm terrain and under a normal load.

Referring first to FIG. 1, a lightweight snow vehicle constructed in accordance with an embodiment of the invention is identified generally by the reference numeral 11. The vehicle 11 includes aa frame assembly, indicated generally by the reference numeral 12. Although in the illustrated embodiment the frame assembly 12 is depicted as being made up of a welded tubular assembly, it is to be understood that various other types of frame configurations can be employed. Furthermore, many features of the invention can be used in snow vehicles of the type which do not use a frame per se but rather employ a body construction which forms a combined body and frame. When the word "frame" is used herein and in the claims, it is intended to cover all of such types of constructions.

The frame 12 includes a head tube 13 which journals a steering shaft 14 to which a steering handlebar 15 is affixed in any known manner. A front ski, indicated generally by the reference numeral 16, is supported for rotation with the steering shaft 14 and for suspension travel relative to the frame 12 by means of a front suspension unit, indicated generally by the reference numeral 17.

The ski 16 and front suspension unit 17 may be of the type as disclosed in my co-pending U.S. patent application entitled "Ski for Snow Vehicle and Suspension Therefor", Ser. No. 312,335, filed Oct. 16, 1981 and assigned to the Assignee of this invention. Reference may be had to that application, which is incorporated herein by reference, for a description of these components. Briefly stated, the ski 16 is preferably formed from a runner of non-metallic construction having one or more downwardly extending ribs 18 formed from a harder, metallic configuration to provide wear resistance and directional stability when travelling over hard surfaces such as ice.

The front suspension 17 includes a tubular damping and suspension element 19 that carries the ski 16 for pivotal movement about a generally transversely extending axis. A pair of pivotally connected forks 21 and 22 permit telescopic movement of the ski 16 relative to the steering shaft 14 while at the same time restrain the ski 16 for steering movement with the steering shaft 14.

A seat 23 is supported on the frame 12 in any suitable manner. Preferably the seat 23 is pivotally supported on the frame 12 and conceals a gas tank (not shown) that is carried by the frame 12 beneath the seat 23.

A driving unit, indicated generally by the reference numeral 24, is supported at the forward end of the frame 12. The driving unit 24 includes an internal combustion engine 25, which may be of any known type, but is preferably of the single cylinder, two-cycle type consistent with the main objectives of the vehicle 11. The engine 25 drives an output pulley 26 via a centrifical clutch. Preferably, the engine, clutch and an incorporated starter assembly are of the type as described in my co-pending application entitled "Starting Arrangement For Internal Combustion Engine", Ser. No. 312,334, filed Oct. 16, 1981 and assigned to the Assignee of this application. As disclosed in that application, this starting, clutch arrangement permits an extremely compact assembly which is, also, consistent with the objects of this invention.

The engine driven pulley 26 drives an input pulley 27 of a continuously variable transmission, indicated generally at 28, via a drive belt 29. The continuously variable transmission 28 may be of any suitable type. The continuously variable transmission has an output sprocket 31 that drives a chain 32 which, in turn, drives an input sprocket 33 of a final drive coupling, indicated generally by the reference number 34 and to be described in more detail.

The drive coupling 34, in turn, drives an endless drive belt, indicated generally by the reference numeral 35. The drive belt 35 is trained around the input of the coupling 34 and, in the illustrated embodiment, a bogie type suspension including a pair of rear guide rollers 36 and intermediate pairs of rollers 37 and 38 that are supported by a guide bar 39. The rearward portion of the guide bar 39 is suspended relative to the frame 12 by means of a rear suspension assembly, indicated generally by the reference numeral 41 and to be described in more detail. Although the invention is described in conjunction with a bogie type of suspension, it is to be understood that it is equally suspectible of use with a guide rail type drive belt arrangement.

Figure 2:
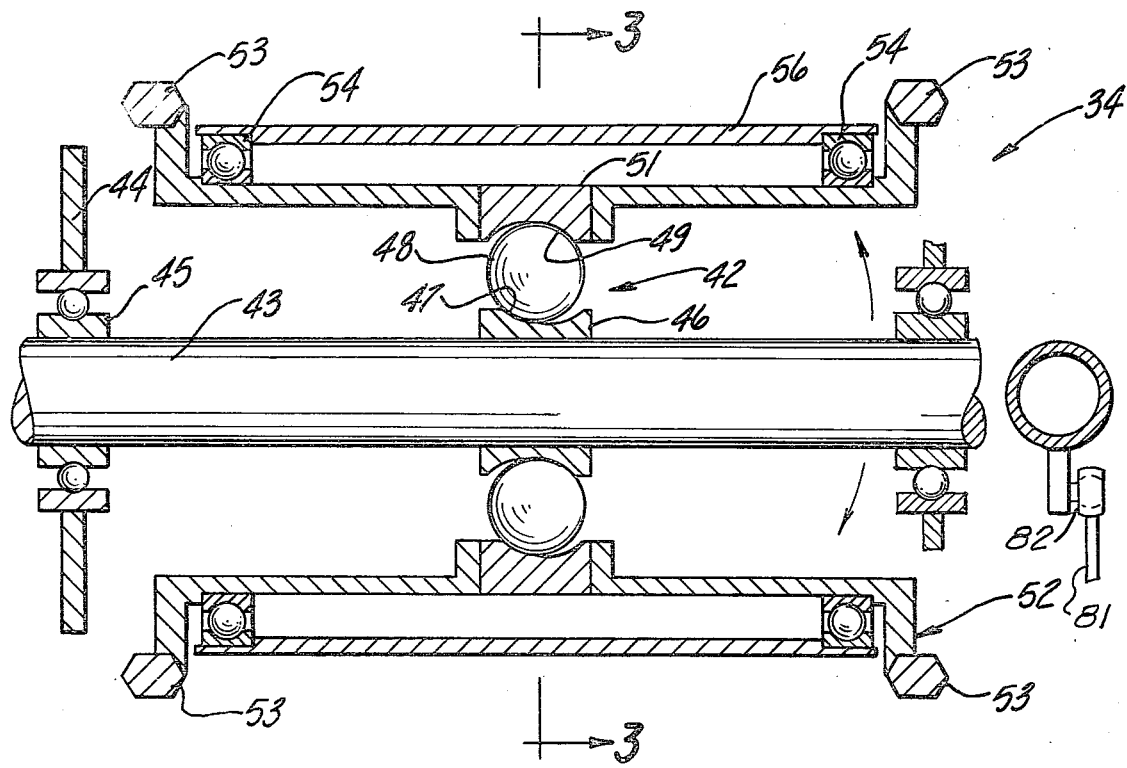
FIG. 2 is an enlarged cross-sectional view, taken generally along the line 2—2 of FIG. 1, and shows the driving arrangement for the drive belt.
Figure 3:
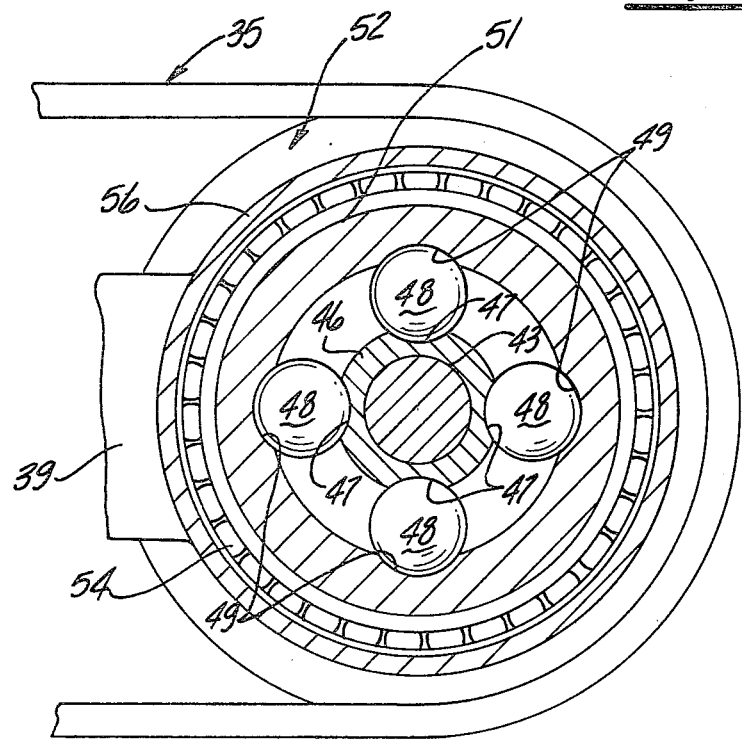
FIG. 3 is a cross-sectional view taken along the line 3—3 of FIG. 2.

Referring now additionally to FIGS. 2 and 3, the driving connection 34 includes a driving type of constant velocity joint, indicated generally by the reference numeral 42, which may be of any known type that permits constant velocity driving relationship between an input shaft and an output shaft while permitting substantial degrees of angular movement therebetween. Although one type of joint suitable for this purpose has been illustrated and will be described, it should be understood that any of the known joints of this type may be used in conjunction with the invention.

The coupling 34 inlcudes an input shaft 43 to which the driving sprocket 33 is affixed in a known manner, as by means of a keyway connection (not shown). The shaft 43 is supported, in the illustrated embodiment, about a fixed axis on the frame 12 by means of mounting plates 44, only one of which appears in the drawings, and an anti-friction bearing 45. Affixed centrally to the shaft 43 is an inner race 46 of the drive joint 42. The race 46 is formed with a plurality of arcuate guide tracks 47, each of which receives a ball 48. The balls 48 may be interconnected and held in spaced relationship by a cage (not shown). The outer peripheries of the balls 48 are engaged in guide tracks 49 of an outer race 51 of the coupling 42. Again, the tracks 49 are arcuate in the opposite sense to the inner race tracks 47 so as to accommodate a wide degree of angular movement between the inner and outer races 46 and 51 about a plane perpendicular to the plane of FIG. 2 without adversely affecting the driving relationship between the inner and outer races.

The outer race 51 is non-rotatably coupled to a driving drum, indicated generally by the reference numeral 52, which has lugs 53 that engage corresponding recesses in the drive belt 35 so as to drive it in a known manner. The drive drum 52 is supported at opposite side adjacent the lugs 53 by means of bearing assemblies 54. The bearing assemblies 54 are rotatably supported by means of a cylindrical member 56 that is affixed in any suitable manner to the guide bar 39.

In the embodiment as thus far described, the front drive arrangement 34 for the drive belt 35 is such that the input shaft 43 is supported about a fixed rotational axis relative to the frame 12. The drive belt 35 may, however, pivotally move about a transverse axis as will be described in more detail, so that the frame 12 may actually be leaned by the operator when negotiating a turn. That is, the driving shaft 43 is not suspended for suspension movement relative to the frame assembly, 12 and, accordingly, the front portion of the drive belt 35 will undergo no suspension travel relative to the frame. The invention may, however, be employed with an arrangement wherein the input shaft 43 is also suspended relative to the frame 12 so that there will be suspension travel at both the front and rear ends of the drive belt 35. If such a suspension arrangement is employed for the front of the drive belt 35, a driving coupling of the constant velocity type like the coupling 42 should still be provided so that the leaning motion of the frame 12 relative to the drive belt 35 will still be retained. The way that such a front suspension can be incorporated into the construction as described is believed to be well within the scope of those skilled in the art and, for that reason, such an arrangement has not been illustrated and will not be described in any more detail.

The rear suspension 41 will now be described in detail by particular reference to FIG. 1 and FIGS. 4 through 6. The guide bar 39 is provided with a notch or recess 57 which extends toward its lower periphery and preferably as close as possible to the drive belt 35. The notch 57 is formed in the portion of the guide bar 39 between the pivotal supports of the rollers 36 and 38. A connecting member 58 is received in the notch 57 and is affixed in a suitable manner to the guide bar 39. The connecting member 58 supports a pivot pin 59 which, in turn, is pivotally connected to a supporting link 61. The link 61 is, therefore, pivotally connected to the guide bar 39 about an axis defined by the pivot pin 59, which axis extends in a generally longitudinal direction relative to the vehicle 11 and which is placed as close as possible to the lower surface of the drive belt 35.

A crossbar 62 of a link assembly, indicated generally by the reference numeral 63, is affixed as by welding to the upper end of the link 61. The crossbar 62 extends transversely outwardly beyond the outer periphery of the drive belt 35. A pair of links 64 are pivotally connected, in any suitable manner, at one of their ends to the rod 62. The opposite ends of the links 64 are pivotally connected to a crossbar 65 which is, in turn, pivotally connected to a fabricated bellcrank assembly, indicated generally by the reference numeral 66. The bellcrank assembly 66 includes a first pair of links 67 that are pivotally connected at one of their ends to the crossbar 65. The opposite ends of the links 66 are pivotally supported relative to the frame 12 by means of a pivot shaft 68. Rigidly affixed to the links 67 but spaced inwardly therefrom is a pair of angularly extending links 69. The links 69 are also pivotal relative to the crossbar 65 and are connected rigidly at their forwardmost end to a bridging member 71 of the bellcrank assembly 66 which is also affixed to the forward ends of the links 67.

The bridging member 71 and forward ends of the links 69 are pivotally connected by means of a pin 72 to a suspension element, indicated generally by the reference numeral 73. The suspension element may be of any known type and is illustrated as being of a combined spring and shock absorber assembly. That is, the suspension element 73 includes a cylinder housing 74 to which the pivot pin 72 is pivotally connected. The cylinder housing 74 also has a collar 75 that loads one end of a coil spring 76. The assembly 73 also includes a piston rod 77 that is pivotally connected at its forward end by means of a pivot pin 78 to the frame 12 beneath the seat 23. This connection also includes a loading arrangement for restraining the opposite end of the coil spring 76 against axial movement. Upon suspension travel, the spring 76 will be compressed and the cylinder assembly 74 will move axially relative to the piston rod 77 and the piston (not shown) carried thereby. The unit 73 includes suitable hydraulic orifices and check valves so as to hydraulically damp the suspension travel, as is well known with such units.

The frame assembly 12 is pivotal relative to the guide rail 39 and drive track 35 at the rear portion thereof about the pivot axis as defined by the pivot pin 59. As has been noted, it is desirable to maintain this pivot axis as close as possible to the point of engagement of the rear portion of the drive belt 35 with the ground. By doing so, the riding characteristics are greatly increased and the leaning of the operator into a curve provides a better feel since the leaning is about a point very close to the point of contact of the drive belt 35 with the terrain over which the vehicle is travelling. An arrangement is provided so as to insure that the effective pivotal movement of the frame 12 relative to the forwardmost portion of the guide rail 39 is also at the most desirable location relative to the forwardmost portion of the drive belt 35.

If it is desirable to locate the front pivot point at a point other than the joint 42, a stabilizer mechanism shown in most detail in FIGS. 1 and 2 may be provided. The stabilizer mechanism includes a link 81 that is pivotally connected in any known manner as by a joint 82 at one of its ends to a member such as a threaded post affixed to the frame 12. The opposite end of the link 81 is connected by means of a pivotal connection such as a pivotal joint 84 to the guide rail 39 at a point where it is desired to locate the front pivot axis between the frame 12 and drive belt 35. The link 81 and the location of the pivot joint 84 have the effect of transferring the effective pivotal axis of the frame 12 relative to the forwardmost portion of the guide rail 39 to the point where the pivotal connection 84 lies.

In order to provide some damping of the pivotal movement of the frame 12 relative to the drive belt 35, any suitable damping mechanism, as by the means of the frictional damper, indicated generally by the reference numeral 85, may be provided. The frictional damper 85 may be of any suitable type and as such can comprise a plate that is affixed to the guide rail 39 and a plate that is affixed for pivotal movement with the link 61 and means to provide frictional contact between these two plates. Other suitable mechanisms may be employed for achieving such damping.

OPERATION

The suspension arrangement employed and the pivotal support of the frame relative to the rear drive belt have been chosen so as to give the vehicle 11 riding characteristics on the snow which will be comparable to the riding of a motorcycle on solid ground. That is, when negotiating a curve, the operator can lean the body of the vehicle so as to improve handling. However, the arrangement is such that leaning of the operator will not result in any loss of contact area between the drive belt 35 and the terrain over which the vehicle 11 is travelling. This has been found to significantly improve rideability and, further, to make the vehicle 11 easier to learn to ride by a novice. Furthermore, the suspension of the drive belt 35 is such that the vehicle 11 has a relatively long effective wheel base. This offers further improvements in handling. The rear axis about which the vehicle leans will still be very close to the point of engagement of the drive belt 35 with the terrain regardless of the degree of suspension loading.

Considering now the situation when travelling over the ground when in a straight direction and when lightly loaded, the suspension element 73 is designed so that the flight of the drive belt 35 between the rollers 36 and 37 will be at a fairly substantial angle relative to the ground, as seen in FIG. 1. As a result, only the rearwardmost portion of the drive belt 35 will engage the terrain and the vehicle 11 has a relatively long effective wheel base under this condition. When loading increases, the rearward portion of the guide rail 39 will tend to swing upwardly causing the link 64 to load the bell crank assembly 66 and cause its pivotal movement about the pivot pin 68. Such pivotal movement causes loading of the suspension element 73 to compress the spring 76 and provide hydraulic damping. As this pivotal movement occurs, it should be readily apparent that the angle between the flight of the drive belt 35 between the rolers 36 and 37 relative to the ground will descrease and a greater contact path will be provided.

When the vehicle 11 is negotiating a turn, the operator turns the handlebars 15 to steer the front ski 16. As has been noted, the ski 16 is configured so that it will provide a good grip on a wide variety of surfaces so provide an adequate steering force. In addition, the operator may lean the frame 12 into the direction of the curve being negotiated. This leaning movement causes pivotal movement of the frame 12 relative to the drive belt 35 about the axis defined by the pivot pin 59 and the joint 84. If the stabilizer link 81 is not employed, the front leaning pivot point will lie at the joint 42. In either case upon such pivotal movement, the driving relationship between the input shaft 43 and the drive belt 35 will be maintained due to the constant velocity joint 42.

It should be readily apparent that an arrangement has been provided wherein a good handling, lightweight snow vehicle may be constructed. By providing pivotal movement between the frame and the driving belt about a longitudinal axis that extends very close to the point of contact between the rear of the drive belt and the terrain over which it travels, good handling results. Furthermore, the suspension arrangement for the drive belt, in addition to permitting this pivotal movement, provides a longer overall effective length between the steering ski and the drive belt and an effective change in contact area under increased loadings. This offers increased handling capabilities from vehicles of the type heretofore proposed.

It is to be understood that the foregoing description has been of a preferred embodiment and that various changes and modification can be made without departing from the spirit and scope of the invention, as defined by the appended claims.

I claim:

1. A small, lightweight vehicle having frame means, a front ski supported for steering movement by said frame means, an endless driving belt, power means, carried by said frame means for driving said driving belt, said driving belt having a drive portion thereof positioned for engaging the terrain over which said vehicle is operated for driving said vehicle therealong, the improvement comprising suspension means for supporting said drive belt and said frame means for relative pivotal movement about an axis that extends generally longitudinally of said frame means so that an operator may lean said frame means relative to said driving belt without changing the area of engagement between said driving belt and the terrain, said axis being defined by a pair of spaced pivot points that lie within the area encompassed by said drive belt.

2. A snow vehicle as set forth in claim 1 further including guide means for defining the path of movement of the driving belt, the suspension means being interposed between said guide means and the frame means.

3. A snow vehicle as set forth in claim 2 wherein the guide means includes a longitudinally extending member and the pair of spaced pivot points comprise forward and rearward pivotal connections between the frame means and said guide means.

4. A snow vehicle as set forth in any of claims 1 through 3 wherein the effective pivot axis of the rear portion driving belt and the frame means is disposed closely adjacent the portion of said driving belt that engages the terrain.

5. A snow vehicle as set forth in claim 1 wherein the suspension means supports the driving belt for vertical movement relative to the frame means.

6. A snow vehicle as set forth in claim 5 further including guide means for defining the path of movement of the driving belt, the suspension means being interposed between said guide means and the frame means.

7. A snow vehicle as set forth in claim 6 wherein the suspension means further supports the guide means for pivotal movement about a transverse horizontally extending axis for changing the angle of the drive portion of the driving belt relative to the terrain in response to the suspension travel.

8. A snow vehicle as set forth in claim 7 wherein the power means has an input driving connection to the driving belt positioned at the transverse horizontal pivotal axis.

9. A snow vehicle as set forth in any of claims 5 through 8 wherein the effective pivot axis of the rear of the driving belt and the frame means is disposed closely adjacent the portion of said driving belt that engages the terrain.

10. A snow vehicle a set forth in claim 1 wherein the power means includes a constant velocity joint having a transversely extending horizontal axis and coupling the power means to the driving belt.

11. A snow vehicle as set forth in claim 10 further including linkage means interposed between the constant velocity joint and the driving belt for transferring the effective longitudinally extending pivotal axis from the axis of the constant velocity joint.

12. A snow vehicle as set forth in claim 11 wherein the suspension means further suspends the driving belt for suspension movement relative to the frame about the horizontal transverse axis of the constant velocity joint.

13. A snow vehicle as set forth in claim 1 further including damping means for damping the pivotal movement between the driving belt and the frame.

14. A snow vehicle as set forth in claim 13 wherein the damping means comprises a frictional damper.

15. A small, lightweight vehicle having frame means, a front ski supported for steering movement by said frame means, an endless driving belt, power means for driving said driving belt, said driving belt having a drive portion thereof positioned for engaging the terrain over which said vehicle is operated for driving said vehicle therealong, the improvement comprising suspension means for supporting said drive belt and said frame means for relative pivotal movement about an axis that extends generally longitudinally of said frame means so that an operator may lean said frame means relative to said driving belt without changing the area of engagement between said driving belt and the terrain and for vertical movement relative to the frame means, said axis being defined by a pair of spaced pivot points that lie within the area encompassed by said drive belt.

16. A snow vehicle as set forth in claim 15 further including guide means defining the path of movement of driving belt, the suspension means being interposed between said guide means and the frame means.

17. A snow vehicle as set forth in claim 16 wherein the suspension means further supports the guide means for pivotal movement about a transverse horizontally extending axis for changing the angle of the drive portion of the driving belt relative to the terrain in response to the suspension travel.

18. A snow vehicle as set forth in claim 17 wherein the power means has an input driving connection to the driving belt positioned at the transverse horizontal pivotal axis.

19. A snow vehicle as set forth in any of claims 15 through 18 wherein the rearward pivotal connection of the driving belt and the frame means is disposed closely adjacent the portion of said driving belt that engages the terrain.

20. A vehicle having frame means, at least one front ski supported for steering movement by said frame means, an endless driving belt having a transverse width, power means for driving said driving belt, said driving belt having a drive portion thereof positioned for engaging the terrain over which said vehicle is operated for driving said vehicle therealong, the improvement comprising suspension means for supporting said drive belt and said frame means for relative pivotal movement about an effective pivot axis that extends generally longitudinally of said frame means and through the area circumscribed by said drive belt so that an operator may lean said frame means relative to said driving belt without changing the area of engagement between said driving belt and the terrain, said power means including a constant velocity joint having a transversely extending horizontal axis and coupling said power means to said driving belt, and linkage means interposed between said constant velocity joint and said driving belt for transferring the effective longitudinally extending pivotal axis from the axis of said constant velocity joint.

21. A snow vehicle as set forth in claim 20 further including guide means within the area circumscribed by the driving belt for defining the path of movement of said driving belt, the suspension means being interposed between said guide means and the frame means.

22. A snow vehicle as set forth in claim 21 wherein the guide means includes a longitudinally extending member and the suspension means includes forward and rearward pivotal connections between the frame means and said guide means, said forward pivotal connection being defined by said linkage means.

23. A snow vehicle as set forth in claim 22 wherein the effective pivot axis of the rear portion driving belt and the frame means is disposed closely adjacent the portion of said driving belt that engages the ground.

24. A snow vehicle as set forth in claim 20 wherein the suspension means further supports the driving belt for vertical movement relative to the frame means.

25. A snow vehicle as set forth in claim 24 further including guide means for defining the path of movement of the driving belt, the suspension means being interposed between said guide means and the frame means.

26. A snow vehicle as set forth in claim 25 wherein the suspension means further supports the guide means for pivotal movement about a transverse horizontally extending axis for changing the angle of the drive portion of the driving belt relative to the terrain in response to the suspension travel.

27. A snow vehicle as set forth in claim 20 wherein the suspension means further suspends the driving belt for suspension movement relative to the frame about the horizontal transverse axis of the constant velocity joint.

28. A snow vehicle as set forth in claim 20 further including damping means for damping the pivotal movement between the driving belt and the frame.

29. A snow vehicle as set forth in claim 28 wherein the damping means comprises a frictional damper.

30. A small, lightweight vehicle having frame means, a front ski supported for steering movement by said frame means, an endless driving belt, power means carried by said frame means for driving said driving belt, said driving belt having a drive portion thereof positioned for engaging the terrain over which said vehicle is operated for driving said vehicle therealong, the improvement comprising suspension means for supporting said drive belt and said frame means for relative pivotal movement about an axis that extends generally longitudinally of said frame means so that an operator may lean said frame means relative to said driving belt without changing the area of engagement between aid driving belt and the terrain, said power means including a constant velocity joint having a transversely extending horizontal axis and coupling the power means to the driving belt, and linkage means interposed between said constant velocity joint and said driving belt for transferring the effective longitudinally extending pivotal axis from the axis of said constant velocity joint.

31. A snow vehicle as set forth in claim 30 wherein the suspension means further suspends the driving belt for suspension movement relative to the frame about the horizontal transverse axis of the constant velocity joint.

32. A snow vehicle as set forth in claim 30 further including guide means for defining the path of movement of the driving belt, the suspension means being interposed between said guide means and the frame means.

33. A snow vehicle as set forth in claim 32 wherein the guide means includes a longitudinally extending member and the suspension means includes forward and rearward pivotal connections between the frame means and said guide means, the linkage means defining said forward pivotal connection.

34. A snow vehicle as set forth in claim 33 wherein the effective pivot axis of the rear portion driving belt and the frame means is disposed closely adjacent the portion of said driving belt that engages the terrain.

35. A snow vehicle as set forth in claim 30 wherein the suspension means supports the driving belt for vertical movement relative to the frame means.

36. A snow vehicle as set forth in claim 35 further including guide means for defining the path of movement of the driving belt, the suspension means being interposed between said guide means and the frame means.

* * * * *